Jan. 14, 1964   J. DUCHÈNE ETAL   3,118,068
INDICATOR FOLLOWER MECHANISM FOR MEASURING APPARATUS
Filed Jan. 14, 1960   2 Sheets-Sheet 1
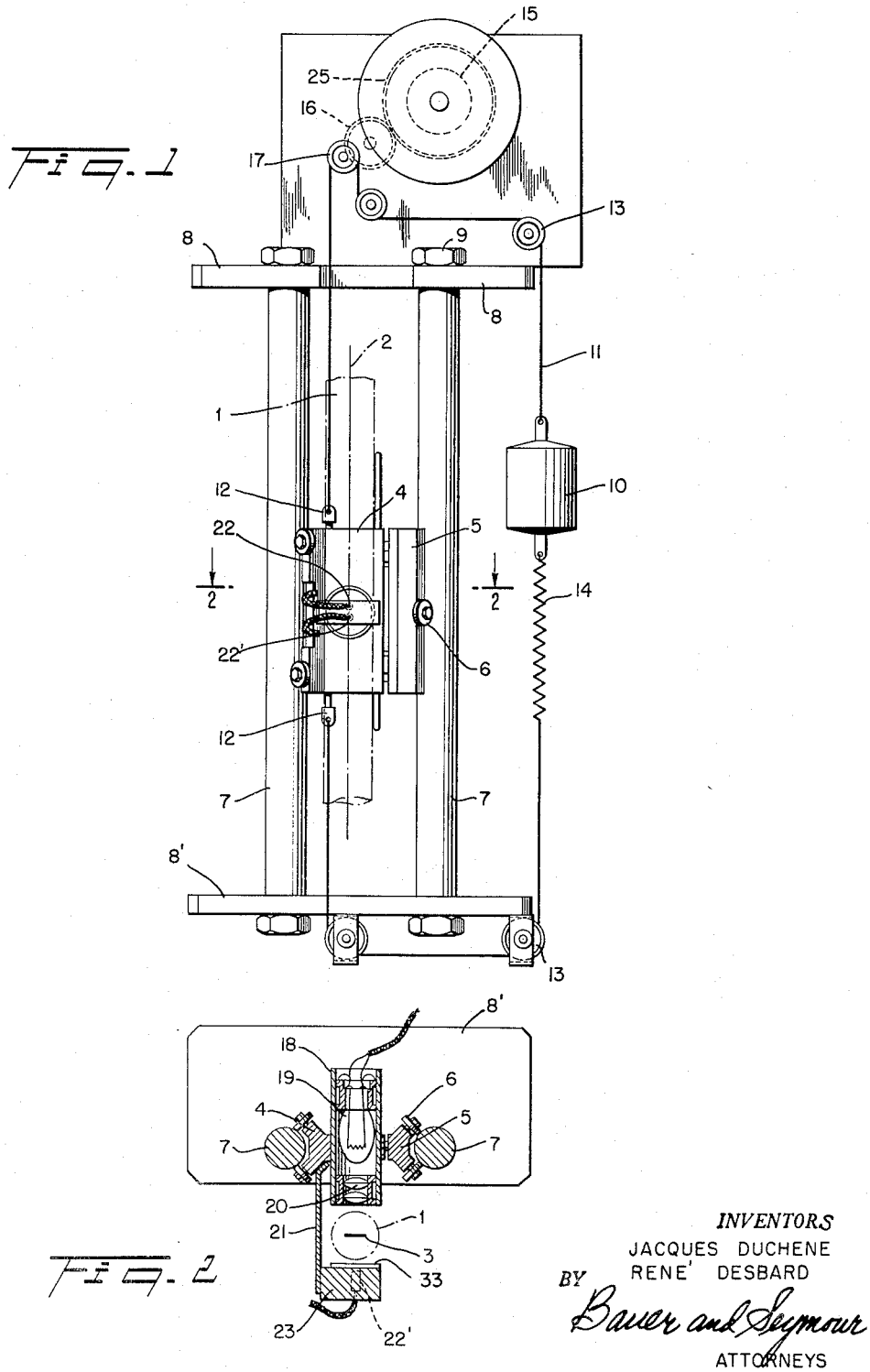
INVENTORS
JACQUES DUCHENE
BY  RENE' DESBARD
Bauer and Seymour
ATTORNEYS

Jan. 14, 1964    J. DUCHÈNE ETAL    3,118,068
INDICATOR FOLLOWER MECHANISM FOR MEASURING APPARATUS
Filed Jan. 14, 1960    2 Sheets-Sheet 2
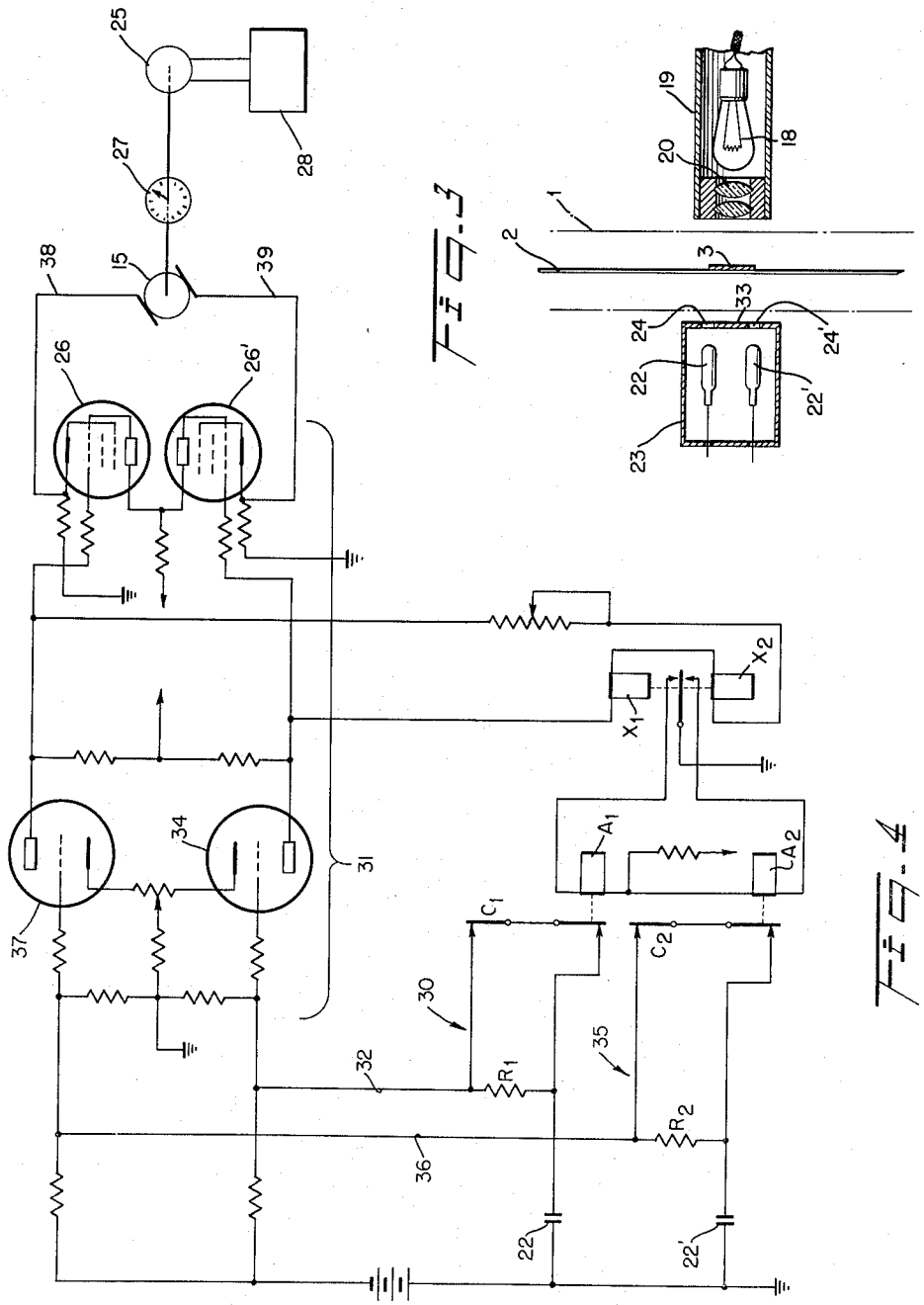
INVENTORS,
JACQUES DUCHENE
RENÉ DESBARD
BY
Bauer and Seymour
ATTORNEYS

United States Patent Office 3,118,068
Patented Jan. 14, 1964

3,118,068
INDICATOR FOLLOWER MECHANISM FOR MEASURING APPARATUS
Jacques Duchêne, Maisons-Alfort, and René Desbard, Hay-les-Roses, France, assignors to Compagnie de Saint Gobain, Paris, France
Filed Jan. 14, 1960, Ser. No. 2,428
Claims priority, application France Jan. 16, 1959
17 Claims. (Cl. 250—231)

This invention relates to a moveable index device or indicator follower for following the motion of a moveable indicator, as in a measuring device. The device of the invention is particularly useful in an apparatus wherein the indicator moves over an extended range during the operation of the apparatus, so that the movement of the indicator and its instantaneous intermediate positions, as well as its final position, are difficult to determine quickly and accurately with existing known mechanisms.

The apparatus of the invention is illustrated in use with a fragmentarily shown spring balance of the "MacBain" type, although it is obvious that the invention is not limited thereto. Balances of the MacBain type are presently used, for example, in the measurement of adsorption at low temperatures and in kinetic studies. It is recognized that such balances possess great sensitivity in comparison to classical balances, such as arm balances and the like. The MacBain balance operates upon the principle of the elongation of a spiral spring as a function of variations in the force which is applied to such spring. As an example, a specimen being studied is placed in a container suspended from the spring, and variations in the weight of such specimen are observed. The springs whose elongation is employed in making the described measurements may be made of quartz and are disposed in the interior of a thermostatic jacket, for example a double-walled envelope or tube made of glass, such envelope having a current of temperature controlled liquid such as water flowing between the inner and outer walls thereof. An indicator is fixedly mounted upon a suspending thread which hangs from the specimen container, such indicator functioning to allow the elongations of the spring to be followed and measured. The spring, as we have seen, will be elongated to varying degrees as a result of changes taking place in the specimen. Although such balance of the MacBain type is very sensitive, difficulty has been experienced with following and measuring the position of the indicator.

In most of the balances of the MacBain type, variations in the weight of the specimen have been visually determined by use of a cathetometer. Such instrument makes it necessary to make successive visual measurements of the indicator with respect to a fixed scale, the values at the successive readings being plotted on a graph to produce a curve. The weight of the specimen at points between the observed values may be obtained by interpolation from the curve.

Prior optical arrangements which permitted the continuous reading of displacements of the indicator were not capable of the precision obtained with the above-described cathetometer, and in addition, such apparatus imposes a certain obscurity in the chamber in which the apparatus is placed. Such apparatus necessarily presented a very limited field which required the index observing means or follower to be moved so that the cross hairs of the indicator would not pass beyond the limits of the field of observation.

The present invention provides an automatic indicator follower which continuously follows and observes a moving indicator of the type, for example, of the indicator of a MacBain balance. The indicator follower of the invention is preferably employed in combination with indicating and/or recording means whereby displacements of the indicator may be continuously observed and/or recorded.

The indicator follower of the illustrative embodiment of the invention includes a mobile carriage carrying a source of light and a receiver for such light, the light source and receiver being placed face to face and spaced to receive the indicator between them. Such indicator is in the form of a screen or mask which cuts off to varying degrees the light from the light source falling upon the receiver. The receiver controls a motor which moves the carriage as a function of the variations in the light which falls upon the receiver, the apparatus being so constructed and arranged that the carriage follows the movement of the indicator. The receiver may include two photoelectric cells. The intensity of the light which such cells receive varies in accordance with variations of their positions with respect to the screen (indicator). The output current of the cells feeds the motor which adjusts the carriage; such current will vary in amperage depending upon the intensity of the light forming upon the cells. The apparatus may be so constructed that the motor is controlled in such manner as always to drive the carriage to a position of equilibrium wherein both photoelectric cells of the receiver are illuminated by light of equal intensity.

There is shown in the drawing and described hereinbelow an illustrative embodiment of apparatus of the invention employed in a balance of the MacBain type. In the drawing accompanying the specification and forming a portion thereof:

FIG. 1 is a somewhat schematic view in elevation of the indicator follower of the invention, only a portion of the MacBain balance with which the follower is associated being shown;

FIG. 2 is a view in horizontal section through the apparatus of FIG. 1, the section being taken along the line 2—2 of FIG. 1;

FIG. 3 is a fragmentary view in vertical axial section through the vertical chamber of the MacBain balance, at the location of the light source, indicator screen, and light receiver; and FIG. 4 is a wiring diagram for the disclosed embodiment of the apparatus wherein the indicator follower constantly seeks the described equilibrium position.

In the drawings, the main portion of the balance is not shown; for simplicity of illustration, in FIG. 3 there is merely shown in dot-dash lines the vertical transparent tube 1 of such balance, and in full lines a quartz thread 2 disposed axially within the tube 1, and an indicator 3 in the form of a vertically disposed screen or mask connected to the thread 2. It is to be understood that the quartz spring of the balance (not shown) is positioned within a thermostatic jacket connected to the upper part of tube 1, that the upper end of thread 2 is connected to the lower end of such spring, and that the container for the specimen being observed is connected to the lower end of the thread 2 and is located adjacent the lower end of the tube 1. Between its ends the quartz thread 2 carries the indicator 3 which may be a rectangular plate mounted vertically or a small tube mounted coaxially upon the thread 2. Indicator 3 is covered with a light absorbent material which is inert in the atmosphere which exists within the tube 1. It will be seen that when the quartz spring lengthens and contracts, the indicator 3 will travel downwardly and upwardly, respectively, within the tube 1. The indicator follower of the present invention is designed automatically to move in such manner as closely to follow the indicator 3 and to seek a position of equilibrium therewith.

The indicator follower includes a vertically moveable carriage having two parts 4 and 5 which are adjustably connected as by bolts, pins, and screws (not shown). The carriage is provided with three pairs of rollers 6, two on part 4 and one centrally vertically on part 5, such rollers being mounted upon stub shafts on the carriage parts and rolling along two laterally spaced vertically positioned cylindrical columns or rods 7. Columns 7 are affixed at their ends to portions 8, 8' of the frame of the balance by means such as nuts 9. The carriage is connected to a counterweight 10 through the medium of a thin cord 11 which is connected to the upper and lower ends of the carriage by fittings 12 and which runs over guide rollers such as those shown at 13. A coil tension spring 14 connected between the lower end of weight 10 and the respective end of the flexible cable insures that cable 11 shall be maintained under a suitable constant tension at all times.

The carriage 4, 5 is driven vertically in reverse directions, as required, by a direct current motor 15. A speed reducer shown schematically at 16 is interposed between motor 15 and a pulley 17 over which the cable 11 is entrained and with which it has frictional contact. It will thus be seen that when motor 15 is energized it drives pulley 17 to cause cable 11 to travel therepast either to raise or lower the carriage, depending upon the directions with which the motor is placed in rotation. The carriage 4, 5 carries on the face thereof which confronts tube 1 and indicator 3 a tube 18 carrying a light bulb 19, and condenser lenses 20, such projecting means serving as a source of a constant luminous flux. Confronting such light source and disposed on the opposite side of the tube 1 and the indicator 3 is a light-receiving device 23 mounted on an arm 21 affixed to carriage part 4. As shown most clearly in FIG. 3, the device 23 is in the form of an enclosure having two vertically spaced similar photoelectric cells 22, 22', an opaque member in the form of a plate 33 forming the wall of the enclosure confronting tube 1. The enclosure 23, which is made of very light material, has two vertically spaced slots or openings 24, 24' through the member 33 thereof, said openings being aligned with the axes of the respective photoelectric cells. The light emitted by the light source and falling upon the cells is limited to narrow bands which pass through the respective slots or openings 24, 24'. The photoelectric cells 22, 22' in the embodiment shown, are of the photodiode type, and are fed from a source of direct current.

The parts are so constructed and arranged, that is, slots or openings 24, 24' are so spaced, the vertical dimension of indicator 3 is such, and the size of the light being emitted from the light source is such that when the indicator follower is in its equilibrium position with respect to the indicator, that is, is in alignment therewith for example at the start of a weighing operation, as shown in FIG. 3, an equal amount of light from the light source falls upon each of the cells. When the weight of the specimen in the specimen holder varies, the length of the quartz spring of the balance changes. This causes a corresponding change in height of the indicator 3, thereby causing the two photoelectric cells to receive different amounts of light falling thereon from the light source. Such difference in light produces a difference in current output of the two cells and, through an amplifier bridge circuit to which the cells are connected, the motor 15 fed from the cells is caused to rotate in the direction which will cause the indicator follower to move in the same direction as the indicator and eventually to assume a new position in equilibrium or alignment therewith, at which position the two cells again receive equal amounts of light and produce equal amounts of current, whereby motor 15 is stopped.

Motor 15 is connected to a circuit, shown in FIG. 4, which is so arranged that the carriage rises when the lower cell 22' receives more light than the upper cell 22, and that the carriage descends when the upper cell 22 receives more light than the lower cell 22'. To avoid desensitizing or enfeebling of the cells because of heating of the photodiodes, it is preferable to make the indicator 3 of such height that it exactly equals the distance between the axes of the cells 22 and 22', so that the beam of light, when the indicator follower is aligned with the indicator, falls only on one-half of each cell. The recording of variations of weight of the specimen measured by the balance may be carried out in the following manner: The displacements of the carriage 4, 5, which correspond to the rotations of motor 15 are transmitted by the latter to a recording device 28 through the intermediary of a potentiometer 25. Potentiometer 25, which is schematically shown in FIG. 1, is of such construction that it may be continuously and repeatedly rotated through 360°. The potentiometer is coupled to the shaft of motor 15 and is connected in a potentiometer circuit fed by batteries. The voltage received at the terminals of the potentiometer, when the motor 15 turns, are applied to the recording device 28. The angular displacement of the potentiometer bears a predetermined fixed relationship to the amplitude of displacement of the carriage; this permits the scale of the displacement of the stylus of the recording device to be correlated with the displacements of the specimen holder of the balance. For example, 1–2 mm. on the band of paper of the recording device may correspond to $\frac{1}{100}$ mm. displacement of the specimen holder. It is, of course, to be observed that the elongations of the quartz spring, as a function of the variations in the weight of the specimen mounted in the specimen holder, will depend upon the sensitivity (a constant value) of the spring.

Besides recording variations in the weight of the specimen, the apparatus may be employed to record the rate of such variations, which is very interesting in various ones of the kinetic studies of reactions in which a balance of the MacBain type is frequently employed. In order to indicate and/or record the speed of variations in weight of a specimen, there may be employed a tachometer 27, which is connected to the shaft of motor 15. Such tachometer may be of the type giving an instantaneous visual reading, or it may also include a recording device connected thereto so as to give a permanent record of such variations. Such recording device may be, for example, one in which the tachometer readings are recorded on a strip of paper.

As was set forth above, the position said of equilibrium or alignment of the indicator follower corresponds to the start of the weighing operation. In some instances the indicator follower may not be located at the level of the indicator. In such case the indicator follower must be placed in such aligned position at the start of the weighing operation. This can be done either manually or automatically. The circuit shown in FIG. 4 permits the indicator follower to adjust itself automatically to such position of equilibrium with the indicator and automatically to follow the indicator throughout the weighing operation.

In FIG. 4 the two photoelectric cells 22 and 22' are shown connected in a circuit wherein they are connected in parallel with one end of each connected to the same terminal of a battery. Connected to the other terminal of cell 22 is a sub-circuit 30 in which a resistance $R_1$ and a switch $C_1$ are connected in parallel, sub-circuit 30 being connected to an amplifier bridge 31 by a wire 32 which leads to the grid of a first triode 34 of the amplifier bridge. The other terminal of cell 22' is connected to a sub-circuit 35 having a resistance $R_2$ and a switch $C_2$ connected in parallel, sub-circuit 35 being connected to the other input wire of amplifier bridge 31 by a wire 36. Such other wire of the amplifier bridge is connected to the grid of a second triode 37, as shown in FIG. 4. The plates of the triodes 34 and 37 are connected, respectively, to the grids of pentodes 26' and 26, respectively. The amplifier bridge and the pentodes 26', 26 function in such manner that when the current delivered to motor 15 through wire 38 is at a higher potential than that delivered to the motor through wire 39, the motor 15 rotates in one direcion, and that when the potential in wire 39 exceeds that in wire 38, the motor 15 rotates in the other direction. Since only a relatively small amount of power is required to raise and lower carriage 4, 5, the motor 15 may be, for example, a direct current motor of the type wherein the field is made up of a permanent magnet and the rotor is wound and connected to leads 38, 39 through slip rings.

The switches $C_1$ and $C_2$ are designed to be opened and closed as required by the operator, whereby to put the respective resistances $R_1$ and $R_2$ in circuit or to shunt them out, respectively. If the contact $C_1$ is open, the resistance $R_1$ is in series with cell 22. When the cell 22 is in such position, when the carriage is rising, that the lower edge of the mask 3 causes it to be in a zone of shade, the disturbance of the equilibrium of the differential bridge circuit is amplified. As the carriage continues to rise, the cell 22 passes out of the zone of shade into the zone of illumination. At this moment the light sensitive surface of cell 22′ enters the zone of shade. The cell 22′ no longer generates any current, whereas the cell 22 generates current and transmits it through resistance $R_1$. The differential bridge is thus now in a state of dis-equilibrium in a direction which is the inverse of the first disequilibrium, and the motor 15 is thus reversed. This action continues for a very short time until both cells 22, 22′ are once more equally lighted. When such condition is reached, the differential circuit is again in equilibrium, and motor 15 stops. Although in what was said above it was assumed that the carriage was being driven in such direction as to rise, the apparatus may also be employed so that the indicator follower descends to follow the indicator, by opening the other of the contacts $C_1$, $C_2$.

The circuit shown in FIG. 4 is completed by relays $X_1$ and $X_2$ of the electromagnetic or the electronic type, the solenoids of such relays being connected to the opposite sides of the output of the first stage of amplification of the amplifier bridge 31. Associated with relays $X_1$ and $X_2$ is a single pole double throw switch which energizes the coils of further relays $A_1$ and $A_2$, respectively, depending upon the direction in which the switch is thrown. Relays $A_1$ and $A_2$ when energized function to open subcircuits 30 and 35, respectively, thereby interposing a resistance $R_1$ and $R_2$ in the circuits of cells 22 and 22′. The thus described further circuit which includes relays $X_1$, $X_2$ and relays $A_1$ and $A_2$ thus functions as a holding circuit to maintain a resistance in the output of the desired one of the two photoelectric cells.

Although only a limited number of embodiments of the invention have been described in the foregoing specification, it is to be expressly understood that various changes may be made therein without departing from the spirit and scope of the invention as will now be apparent to those skilled in the art.

What is claimed is:

1. Measuring apparatus having an indicator moveable in accordance with the response of the apparatus, an indicator follower moveable along the path of movement of the indicator, means indicating when the indicator follower is aligned with the indicator, means to denote the position of the indicator follower when it is aligned with the indicator, and means to show the speed of travel of the indicator follower in following the indicator.

2. Measuring apparatus having an indicator moveable in accordance with the response of the apparatus, an indicator follower moveable along the path of movement of the indicator, means indicating when the indicator follower is aligned with the indicator, means to denote the position of the indicator follower when it is aligned with the indicator, a reversible electric motor automaticilly to adjust the indicator follower along the path of movement of the indicator to a position of alignment therewith, and control means for said power means, said control means including means which energizes the power means to drive the indicator follower in such direction as to restore alignment of the indicator follower and the indicator upon movement of the latter from a position of alignment with the indicator and which deenergizes the power means when the indicator follower regains alignment with the indicator, the control means comprising a mask forming at least a part of the indicator, a source of light rays on one side of the mask, two identical photoelectric cells sensitive to said rays on the other side of the mask, said cells being spaced along the path of movement of the indicator, said source of rays and the cells being mounted on the indicator follower for movement therewith, the light source, cells, and mask being so constructed and arranged that when the indicator follower is aligned with the indicator both cells receive equal amounts of rays from the light source and that when the indicator follower is out of alignment with the indicator the cells receive unequal amount of rays from the light source, and a control circuit of the bridge type interposed between the cells and the motor and functioning to drive the motor in the proper direction to restore the indicator follower to a position of alignment with the indicator.

3. In a weighing balance of the MacBain type, said balance having a spring from which a specimen holder is suspended by a thread which carries an indicator which allows the variations in length of the spring as functions of the weight of the specimen to be observed and determined, the improvement which comprises a mask forming at least a part of the indicator, a source of light and a receiver of light mounted on a carriage on opposite sides of the mask, the carriage being mounted for movement along the path of movement of the indicator, the receiver comprising two photoelectric cells spaced along the path of movement of the indicator and the carriage and an opaque member confronting the source of light and having light receiving openings aligned with the axes of the cells, the dimension of the mask parallel to the path of movement thereof being equal to the distance between the axes of the cells, means for moving the carriage, and means controlled by the difference in the quantity of light falling upon the two photoelectric cells of the receiver for driving the means for moving the carriage so that the carriage follows the displacements of the indicator.

4. Apparatus as defined by claim 3, comprising means to indicate the displacements of the indicator follower, whereby to show the displacement of the indicator when the indicator follower is aligned with the indicator.

5. Apparatus as defined by claim 3, comprising a potentiometer, a recording device fed by the potentiometer, and a motor for driving the indicator follower, the potentiometer being drivingly connected to said motor.

6. Apparatus as defined by claim 5, comprising a tachometer connected to the motor to indicate the rate of variation of the weight of the specimen.

7. Apparatus as defined by claim 3, wherein the electric motor is reversible, and comprising a differential bridge amplifier having opposite output feed wires connected to the motor, the two cells being connected to the respective sides of the first stage of the amplifier so that the motor is automatically fed by the amplifier in such manner as to move the indicator follower into alignment with the indicator at the start of a weighing operation.

8. Apparatus as defined by claim 3 comprising means for automatically recording the measure of the displacement of the indicator, then of the variation in weight, during the displacement of the carriage.

9. Apparatus as defined by claim 3 wherein means are provided for automatically readjusting the carriage in the position corresponding to the start of the weighing operation comprising two cells differentially connected to the first stage of the amplifier of the input circuit of the motor driving the carriage.

10. An apparatus of the class described, said apparatus having in combination a moveable indicator which allows the variations in the position of the indicator as functions of variable phenomena to which the apparatus is subjected to be observed and determined, a mask forming at least a part of the indicator, a source of light and a receiver of light mounted on a carriage on opposite sides of the mask, the carriage being mounted for movement along the path of movement of the indicator, the receiver comprising two photoelectric cells spaced along the path of movement of the indicator and the carriage and an opaque member confronting the source of light and having light receiving openings aligned with the axes of the cells, the dimension of the mask parallel to the path of movement thereof being equal to the distance between the axes of the cells, means for moving the carriage, and means controlled by the difference in the quantity of light falling upon the two photoelectric cells of the receiver for driving the means for moving the carriage so that the carriage follows the displacements of the indicator.

11. In a weighing balance of the MacBain type, said balance having a fixed supporting structure, a spring from which a specimen holder is suspended by a strand which carries a vertically movable indicator permitting the variations in length of the spring as a function of the variation of the specimen in the specimen holder to be observed and determined, the improvement which comprises a device movable vertically parallel to the indicator, a screen on the indicator facing the movable device, a light source and a light receiver on the movable device on opposite sides of the screen, an endless strand carrying the indicator, pulleys on the fixed supporting structure over which the endless strand is entrained, means for maintaining the endless strand under constant tension, a weight secured to the endless strand for counter-balancing the movable device, a reversible motor, means connecting the motor to one of the pulleys over which the endless strand is entrained whereby selectively to drive the movable device in opposite directions, and circuit means connecting the light receiver to the motor so as to govern the direction an extent of turning of the motor as a function of the light received by the light receiver, whereby the movable device follows the displacements of the indicator with a precision sufficient constantly to assure a great sensitivity of the apparatus.

12. Apparatus as defined by claim 11, wherein the light receiver has a housing with one face thereof confronting the light source, said one face having two narrow horizontal slits disposed one above the other, two photoelectric cells in the housing, the cells being located in alignment with the respective slits, the circuit means including means electrically connecting the photoelectric cells to the motor, said last named means energizing the motor so as to raise the device when the lower cell receives more light than the upper cell, and energizing the motor so as to lower the device when the upper cell receives more light than the lower cell.

13. Apparatus as defined by claim 12, wherein the vertical separation of the slits equals the height of the screen, whereby light from the light source falls upon a part only of each of the photoelectric cells when the movable device is in equilibrium position with respect to the mask.

14. Apparatus as defined by claim 13, wherein the photoelectric cells are positioned with their axes a distance apart which is equal to the height of the mask.

15. Apparatus as defined by claim 13, comprising a potentiometer, a registering device fed by the potentiometer, the potentiometer being drivingly connected to the motor which drives the movable device.

16. Apparatus as defined by claim 15, comprising a tachometer connected to the motor to indicate the rate of variation of the weight of the specimen.

17. Apparatus as defined by claim 12, wherein the electric motor is reversible, and comprising a differential bridge amplifier having opposite output feed wires connected to the motor, the two cells being connected to the respective sides of the amplifier so that the motor is automatically fed by the amplifier in such manner as to move the device into alignment with the indicator at the start of a weighing operation.

References Cited in the file of this patent

UNITED STATES PATENTS

| | | |
|---|---|---|
| 2,113,436 | Williams | Apr. 5, 1938 |
| 2,376,459 | Stevens | May 27, 1945 |
| 2,514,985 | Banner | July 11, 1950 |
| 2,777,069 | Saeman | Jan. 8, 1957 |
| 2,810,316 | Snyder | Oct. 22, 1957 |
| 2,879,054 | Wohler | Mar. 24, 1959 |
| 2,948,817 | Carpenter | Aug. 9, 1960 |